(12) United States Patent
Marissen et al.

(10) Patent No.: US 7,423,084 B2
(45) Date of Patent: Sep. 9, 2008

(54) METHOD OF PRODUCING HIGH STRENGTH ELONGATED PRODUCTS CONTAINING NANOTUBES

(75) Inventors: Roelof Marissen, Born (NL); Martin Antonius Van Es, Brunssum (NL)

(73) Assignee: DSM IP Assets B.V., Heerlen (NL)

( * ) Notice: Subject to any disclaimer, the term of this patent is extended or adjusted under 35 U.S.C. 154(b) by 77 days.

(21) Appl. No.: 10/504,125

(22) PCT Filed: Feb. 7, 2003

(86) PCT No.: PCT/NL03/00083

§ 371 (c)(1),
(2), (4) Date: Aug. 11, 2004

(87) PCT Pub. No.: WO03/069032

PCT Pub. Date: Aug. 21, 2003

(65) Prior Publication Data

US 2005/0089677 A1   Apr. 28, 2005

Related U.S. Application Data

(60) Provisional application No. 60/376,838, filed on May 2, 2002, provisional application No. 60/367,506, filed on Mar. 27, 2002.

(30) Foreign Application Priority Data

Feb. 15, 2002  (EP) .................................. 02075624
Apr. 5, 2002   (EP) .................................. 02076314

(51) Int. Cl.
  *C08K 3/04*  (2006.01)
(52) U.S. Cl. ...................... 524/495; 524/496
(58) Field of Classification Search ................. 524/495, 524/496
See application file for complete search history.

(56) References Cited

U.S. PATENT DOCUMENTS

| | | |
|---|---|---|
| 6,299,812 B1 | 10/2001 | Newman |
| 6,331,265 B1 | 12/2001 | Dupire |
| 6,448,359 B1 | 9/2002 | Kavesh |
| 6,900,264 B2 * | 5/2005 | Kumar et al. ............... 524/495 |

FOREIGN PATENT DOCUMENTS

| | | |
|---|---|---|
| EP | 055 001 | 6/1982 |
| EP | 775 222 | 5/1997 |
| EP | 939 148 | 9/1999 |
| EP | 1054036 | * 11/2000 |
| WO | 97/09272 | 3/1997 |
| WO | 98/39250 | 9/1998 |
| WO | 01/12700 | 2/2001 |
| WO | 01/63028 | 8/2001 |
| WO | 01/73173 | 10/2001 |
| WO | 01/92381 | 12/2001 |

* cited by examiner

*Primary Examiner*—Edward J Cain
(74) *Attorney, Agent, or Firm*—Nixon & Vanderhye P.C.

(57) ABSTRACT

The present invention relates to a method of producing a high strength and high modulus elongated product comprising the steps of (a) making a composition comprising a semi-crystalline polymer and carbon nanotubes, (b) extruding said composition into an elongated product, and (c) stretching the product below the melting point of the polymer, wherein in step (a) the composition is a colloidal dispersion of nanotubes in a solution of the polymer. The advantages of the invention include production of elongated products, like fibers with higher tensile properties, especially strength, with a lower concentration of nanotubes than with a known method. The invention also concerns a high strength elongated product containing nanotubes obtainable by the method according to the invention, especially a polyolefin fiber containing nanotubes having a tensile strength of higher than 3.0 GPa. The invention also relates to a process for making composite articles wherein high strength elongated products, preferably fibers, according to the invention are used and to anti-ballistic composites comprising said products.

28 Claims, No Drawings

METHOD OF PRODUCING HIGH STRENGTH ELONGATED PRODUCTS CONTAINING NANOTUBES

CROSS REFERENCE TO RELATED APPLICATION

This application is the National Phase of International Application PCT/NL03/00083 filed Feb. 7, 2003 which designated the U.S., and was published in the English language.

The invention relates to a method of producing an elongated product comprising the steps of (a) making a composition comprising a semi-crystalline polymer and nanotubes, (b) extruding said composition into an elongated product, and (c) stretching the product below the melting point of the polymer. The invention further relates to a high strength elongated product containing nanotubes obtainable by the method according to the invention, especially a polyolefin fibre containing nanotubes having a tensile strength of higher than 3.0 GPa. The invention also concerns a process for making composite articles wherein high strength elongated products, preferably fibres, according to the invention are used, and anti-ballistic composites comprising said elongated products.

Such a method is known from WO 00/69958 A1. In this patent application a method is described wherein in step (a) carbon nanotubes are introduced into a semi-crystalline polymer, i.c. isotactic polypropylene (iPP), via melt compounding, which composition is then melt extruded in step (b) into fibres, and in step (c) stretched in the solid state so as to orient the carbon nanotubes. It is reported that iPP fibres can be made with a tensile strength of up to about 2.3 GPa and a tensile modulus (at 1% strain) of up to about 21 GPa. The maximum solid-state stretch ratio that could be applied is indicated to be 6.3.

Within the context of this application an elongated product is understood to be any elongated product having a dimension in at least one direction that is much larger than in at least one of the other directions. Examples of such elongated products include fibres or filaments, tapes, ribbons, films, and sheets.

Carbon nanotubes, hereinafter also referred to as nanotubes, are carbon-based molecules having a structure related to the structure of so-called Buckminsterfullerene ($C_{60}$) and other fullerenes. Nanotubes have a cylindrical structure and may grow into nearly endless tubes of from 50 nm up to 10 mm in length. The nanotube diameter may be from about 0.5-100 nm. Nanotubes are presently typically made from carbon, but also other atoms may be present. Nanotubes from other atoms like silicon, nitrogen, boron or mixtures thereof are also reported. Nanotubes would also be an ideal reinforcing fibre for polymer composites, because they have a very high aspect ratio (length-to-diameter ratio), but are still short enough to show enough flowability when incorporated into a polymer matrix. Nanotubes can have only a single-wall structure (single-wall nanotubes, abbreviated as SWNT), a double-wall structure (DWNT) or a multi-wall structure (MWNT), resembling concentric cylinders of several layers. Nanotubes show a strong tendency to form aggregates of up to 1000 nanotubes, for example in the form of branched clusters of roughly parallel arranged tubes, inter-connected via individual nanotubes that extend into different clusters. Such aggregates, also referred to as ropes can agglomerate to form a powder or a sheet material. Nanotubes are generally difficult to disperse in organic solvents, because of strong particle interaction in aggregates. Preparation of nanotubes, especially SWNT, and their properties and potential applications have been subject of numerous publications, see for example WO 97/09272 A1 and WO 98/39250 A1.

A disadvantage of the method as described in WO 00/69958 A1 is that the tensile properties of the iPP/nanotubes fibre that is obtained are still not at the level desired for the most demanding applications, like advanced structural composites or anti-ballistic clothing.

The object of the present invention is to provide a method for producing an elongated product comprising a semi-crystalline polymer and carbon nanotubes, which product shows tensile strength significantly higher than can be obtained by the known method.

This object is achieved according to the invention with a method comprising said steps (a)-(c) wherein in step (a) the composition is a colloidal dispersion of nanotubes in a solution of the polymer.

A further advantage of the method according to the invention is that a lower concentration of the expensive nanotubes material can be used to obtain a certain increase in properties. On the other hand, the method allows a higher amount of nanotubes to be dispersed into a polymer matrix and to contribute to strength increase, than would be possible via conventional melt mixing.

From EP 0055001 A1 it is known that a polyethylene fibre containing filler particles can be made via a solution spinning process, but this publication does not disclose or suggest to use nanotubes, nor a colloidal dispersion of particles as in the method of the present invention. In addition, the tensile strength of fibres reported therein does not exceed a level of 2.0 GPa.

Within the context of the present application a colloidal dispersion of nanotubes is understood to be a dispersion of nanotubes in a suitable solvent, wherein the nanotubes are dispersed at least as a mixture of individual nanotubes and aggregates of small particle size. Such colloidal dispersion for example does not show visual sedimentation after at least 10 minutes without stirring. The average particle size of aggregates in such dispersion is generally smaller than 250 nm, preferably smaller than 200 nm, more preferably smaller than 150 nm, even more preferably smaller than 100 nm, still more preferably smaller than 50 nm, and most preferably smaller than 25 nm. With average particle size is meant the average apparent diameter as observed with microscopy of the cross-section of aggregated nanotubes particles. With optical microscopy normally no particles can be seen in a sample of such a colloidal dispersion. In order to improve dispersability, the nanotubes preferably have an average length of the tube that is smaller than 20 micron, more preferably smaller than 5 micron, still more preferably smaller than 3 micron, even more preferably smaller than 1000 nm, or even smaller than 500 nm. The advantages of making a dispersion of aggregates of ever smaller size, is that the nanotubes can also be better dispersed in the polymer matrix, which can result in a more effective contribution of the nanotubes to the mechanical strength of the composite fibre. The length of nanotubes should, however, not be too short, since a high aspect ratio contributes more to a high strength of the final composition. Preferably, the nanotubes show an aspect ratio of at least 100, more preferably at least 250, even more preferably at least 500, still more preferably at least 1000 and most preferably at least 2000. In WO 98/39250 A1 several ways are described to adjust the length of nanotubes in a controlled way.

In the method according to the invention preferably carbon nanotubes are used, because of their combination of properties and emerging availability.

Preferably, single-wall nanotubes (SWNT) are used, because they contribute more effectively to the mechanical strength of a composite per volume fraction of nanotubes than MWNT.

The semicrystalline polymer that can be used in the method according to the invention may be selected from a broad range of polymers. Semi-crystalline is herein understood to mean that the polymer molecules show local ordering, affecting the reological and/or mechanical properties of the polymer, and which ordering is disrupted upon heating at a certain temperature; i.e. the melting temperature ($T_m$). Preferably a polymer is used that shows significant molecular orientation upon stretching or elongating a composition or solution comprising said polymer. Suitable polymers include polyamides, polyesters, polyketones, polyoxazoles, polyimidazoles, polyvinyls, and polyolefines. Since solution spinning of a polymer is generally more expensive than melt spinning in view of the large amounts of solvents that need to be used and recovered, the method according to the invention preferably uses a semi-crystalline polymer that can not be processed via melt spinning, because of too high a melting point or too high viscosity, or a polymer that can be better oriented and elongated during solution spinning, resulting in higher strength. Examples of such polymers include aromatic polyamides, like poly(para-phenylene terephthalamide); polybenzoxazoles or polybenzothiazoles, like poly(p-phenylene-2,6-benzobisoxazole); polyvinyls, like polyvinylalcohol, polyacrylonitril, or copolymers thereof; aliphatic polyketones; and polyolefines, preferably of high molar mass, like polypropylenes and polyethylenes. Solution spinning is also preferred for making fibres from precursor polymers that react during spinning, like poly(2,6-diimidazo[4,5-b4',5'-e]pyridinylene-1,4(2,5-dihydroxy)phenylene).

In general, a process for extruding an elongated product from a polymer solution, also called a solution spinning process, can comprise one or more of the following steps: making of a polymer solution; spinning of the solution into a elongated product; stretching of the product in its fluid state (also called solution stretching); solidifying the product by cooling in air or by quenching in a non-solvent; stretching of the solvent-containing solidified product below the melting point ($T_m$) of the polymer (also called gel stretching); at least partially removing the solvent; stretching the resulting solid product, optionally at higher temperature but still below $T_m$ (solid state stretching); and removing residual solvent/non-solvent. The melting point ($T_m$) is understood to be the melting point of the polymer as such, determined by thermal analysis, e.g. the peak-melting temperature found by DSC analysis (following a standard procedure as in ISO 3146). Solution spinning of an aromatic polyamide is described in e.g. EP 0939148 A1, of a polybenzoxazole in e.g. EP 0775222 A1. A process for solution or gel spinning of high molar mass polyethylene fibres is described in more detail in WO 01/73173 A1. Depending on the specific polymer and solvent used, above indicated steps may also take place more or less simultaneously.

In case of polymers with a highly rigid molecular chain structure, polymer solutions thereof may show lyotropic or (semi) liquid crystalline behaviour, such as for poly(p-phenylene terephthalamide). Substantial molecular orientation is than generally already achieved during spinning and solution stretching; during these stretching steps the temperature is normally below $T_m$ of the polymer.

In a preferred embodiment according to the invention the solvent normally used for solution spinning of the polymer is also a suitable solvent for making a colloidal dispersion of nanotubes. Highly polar polymers are often also very difficult to dissolve because of their high crystallinity, and solvent systems like highly concentrated strong acids are used for solution spinning. Preferably, such solvents, like for example fuming sulphuric acid or oleum that is used in spinning aromatic polyamides, are used for making a colloidal dispersion of nanotubes.

In another embodiment of the method according to the invention comprising said steps (a)-(c), the composition of step (a) is obtained by mixing
 (a1) a colloidal dispersion of nanotubes and optionally other components in a solvent 1; and
 (a2) a solution of the polymer in a solvent 2, wherein solvents 1 and 2 are miscible;
 (b) extruding is performed from the mixture obtained in (a); and
 (c) a stretch ratio of at least 5 is applied below the melting point of the polymer.

This embodiment is especially useful for making elongated products from polymers that are best dissolved and spun from a solvent, which is not a very suited solvent for making a colloidal nanotubes dispersion.

Preferably, the method according to the invention uses polyvinyls, like polyvinylalcohol, polyacrylonitril, or copolymers thereof; aliphatic polyketones, like an alternating copolymer of ethylene and carbon monoxide; and polyolefines, preferably of high molar mass, as the polymer. Even more preferred are high molar mass polyolefines, like polypropylene and polyethylene and their copolymers, because very strong fibres can be obtained via solution spinning. Most preferably, a high molar mass polyethylene, like an ultra-high molar mass polyethylene (UH-PE) is used. Such polyethylenes have molar masses above about 500,000 g/mol, more preferably above about 1,000,000 g/mol (mass or weight averaged molar mass, $M_W$). The polyethylene may contain minor amounts of one or more other alpha-olefins as a comonomer, such as propylene, butylenes, pentene, hexane, 4-methylpentene, octene, and the like. Preferably, the polyethylene is substantially linear, which is understood to mean that the polyethylene contains less than 1 side chain or branch per 100 carbon atoms, preferably less than 1 per 500, and more preferably less than 1 per 1000. Whereas such high molar mass polymers may be too viscous in the melt to allow a melt extruding or spinning process, with a solution spinning process, more specifically with a gel spinning process, elongated products like polyethylene fibres of high strength and modulus can be produced. Stretching the product below $T_m$ during solution, gel and/or solid-state stretching results in a marked increase in tensile properties.

In one embodiment of the method according to the invention a colloidal dispersion is made by mechanically dispersing nanotubes in a 'good solvent' for nanotubes, optionally with sonication; that is with ultra-sonic vibration. Various hydrocarbons are mentioned as suitable solvents in WO 9839250 A1. Preferably, the solvent (or solvent 1 in step (a1)) is selected from the group of halogenated hydrocarbons, more preferably from chlorinated hydrocarbons. Use of these solvents results in smaller ropes of nanotubes. Suitable examples include chlorinated aliphatic hydrocarbons and chlorinated aromatic hydrocarbons. Very small aggregates and some individual dispersion may result when using solvents like 1,2-dichloroethane and 1,2-dichlorobenzene. It has further been observed that dispersion is better if a low concentration of nanotubes in solvent 1 is used. Too low a concentration, however, is not practical and might cause problems in subsequent steps of the method according to the invention. A suitable concentration range is therefore 0.1-10 mass % nanotubes in solvent 1, preferably 0.5-5 mass %, more preferably 1-3 mass %. The concentration and amount of (a1) is preferably chosen such, that after combining with (a2) the mixture contains about 0.5-20 mass % of nanotubes based on the polymer, preferably about 1-15 mass %, and even more preferably about 2-10 mass %; this also being the concentration of nanotubes in the finally obtained fibre.

In another preferred embodiment a dispersion aid, like a surfactant is added to (a1) as other component, the advantage being an even better dispersion. Optionally, sonication may be used. Preferably a non-ionic surfactant is used, like an ester- or amide-derivative of a long chain carboxylic acid, like a fatty acid, or a block copolymer containing two blocks of different character. Typical examples of the latter are compounds containing an aliphatic polyether segment, for example based on an alkylene oxide, combined with a more apolar segment. Such compounds are also used in other application areas, such as in dispersing colorants in a polymer matrix, and are known to the person skilled in the art. Another example of a suitable dispersion aid is a highly branched oligomer or copolymer containing both polar and apolar groups, for example a polyesteramide copolymer. With such a highly branched oligomer as dispersion aid, very finely dispersed nanotubes can be obtained.

Preferably, nanotubes are mixed with the dispersion aid as such, before diluting with solvent 1. In view of the very high surface area of nanotubes, a relatively large amount of dispersion aid proves to be useful, that is amounts equalling or exceeding the mass of nanotubes may be used. The advantage of using dispersion aids, is that also colloidal dispersion in more polar solvent can be prepared. An, advantageous effect of using a surfactant on dispersing nanotubes was also demonstrated in Chem. Mater. 2000, 12, 1049-1052, in making a thermoset epoxy composite from an acetone solution, but this publication is silent on using nanotubes in fibre spinning.

In another embodiment of the method according to the invention, a certain amount of the polymer is already added to (a1) as other component. This may be done before, during or after initially dispersing the nanotubes. It is also possible to dissolve the polymer in a separate amount of solvent 1, and then combine the nanotubes dispersion and polymer solution. The advantage of adding a certain amount of the polymer in this stage is that the polymer helps preventing re-aggregation of nanotubes into non-dispersed particles. The polymer concentration in (a1) is preferably relatively low, for example less than 5 mass %, preferably less than 2.5 mass % based on (a1), so that the viscosity of the mixture remains relatively low to ensure better mixing and/or dispersing.

In a further embodiment of the method according to the invention, the dispersion (a1) can be first prepared with a low concentration of components, but can be concentrated after a colloidal dispersion of the nanotubes is obtained. The advantage thereof is, that a possible negative effect of solvent 1 on producing an elongated product from the polymer solution after combining (a1) and (a2) is reduced or prevented, while still an optimum dispersion can be made. Such a negative effect may result if solvent 1 would for example hamper solidification of a fluid product of polymer solution into a solvent-containing gel product. Especially in case (a1) also contains some of the polymer, re-aggregation of nanotubes into aggregates during such a concentration step is prevented.

In still another embodiment of the method according to the invention, nanotubes that have been chemically modified are used in step (a). Such modification may have introduced functional groups at the end of the tube, which may be opened, or on the surface. These functional groups affect the surface properties of the nanotubes, and contribute to easier dispersion into individual nanotubes in a solvent. Such functional groups may contribute to the desired increase in strength of the composite elongated product. Chemical modification of SWNT is a.o. described in WO 98/39250 A1.

As already described above, solvent 1 is a 'solvent' for nanotubes solution processing of the polymer concerned. In case of highly polar polymers like aromatic polyamides, polybenzoxazoles or polybenzothiazoles solvent 2 will often comprise a highly concentrated strong acid; solvent 1 is miscible and compatible therewith. For the other group of polymers indicated above, solvent 2 is generally an organic solvent with a polar or apolar character, depending on the polymer. Typical examples include N-methylpyrrolidone, dimethylacetamide, alcohols or glycols, and aliphatic or aromatic hydrocarbons. Preferably, solvent (1) and solvent (2) are the same.

Polyolefines of high molar mass, especially UH-PE, as used in a preferred embodiment of the method according to the invention, are in many solvents only soluble at higher temperatures and solutions obtained can solidify upon cooling into a gel-like mass, also referred to as gel product. This effect is advantageously used in the so-called gel-processing or gel spinning of UH-PE solutions into high strength elongated products, especially fibres. Suitable solvents as solvent 2 for this process are aliphatic, cycloaliphatic and aromatic hydrocarbons with boiling points of at least 100° C., preferably at least equal to the extrusion or spinning temperature. The solvent may be removed from the spun fiber by evaporation or by extraction with another solvent that is miscible with the spinning solvent and is a non-solvent for the polymer. In the first case, the boiling temperature of the solvent is preferably not so high that evaporation from the product spun becomes very difficult. Typical examples include octane, nonane, decane or isomers thereof and other linear or branched hydrocarbons, like parafines, petroleum fractions, toluenes or xylenes, naphthalene, or hydrogenated derivatives thereof, such as tetraline, decaline, but also halogenated hydrocarbons. A suitable combination of solvent 1 and solvent 2 is dichlorobenzene and decaline. The concentration of the polymer in solvent 2 is chosen such that (a2) has a suitable viscosity for processing this solution into elongated products like fibres in step (b), and will be dependent on the solvent, the molar mass and type of polymer, as well as on processing conditions, like temperatures and shear rates. Suitable concentration ranges may vary from 1 to 50 mass %, for UH-PE a typical range is 2-30 mass %, preferably 5-15 mass %.

In step (b) of the method according to the invention said polymer solution containing dispersed nanotubes is spun into elongated products, like fibres, through a spinneret comprising at least one orifice or hole. The dimensions and geometry of the orifice may vary substantially, and can be optimised by the skilled person depending on the type of polymer and solvent used. Upon leaving the orifice the product may still be in a fluid state (solution product), but show enough strength to withstand some drawing before the product solidifies. Generally, the solution product is extruded into air before it is cooled in e.g. a liquid bath, during which phase the product can be highly stretched. The solution stretch ratio, including possible stretching in the orifice and in the air-gap, normally referred to as solution draw ratio or draw down ratio, may vary within wide ranges; from 1 of up to several hundreds, and stretching can be performed above or below $T_m$, depending on the type of polymer. For polymers with relatively flexible molecules, like polyolefins, the solution stretch ratio may be relatively low, whereas rigid chain polymers are extensively stretched in this phase. The solution product may be cooled by a flow of air, or by quenching in a liquid, being a non-solvent for the polymer. If this liquid is miscible with solvent 1 and/or 2, the solvent can be extracted from the fibre. The liquid is generally also a non-solvent for the nanotubes, so that these remain in the polymer phase. If the quenching liquid is not miscible with solvent 2, it merely functions as an alternative to air-cooling. In this case a solidified product is obtained that still contains solvent 2. This solvent-containing product is generally referred to as being in a gel-state and called a gel product. Part of the solvent may be removed by extraction or evaporation. During such removal, the temperature may be increased somewhat, but should not be so high that the polymer would re-dissolve, and will normally be below $T_m$. This gel product may again be stretched, typical gel stretch ratios may vary from 1 to about 100 or even more, depending on the type of polymer and stretch ratios applied in the other stages (solution and solid-state). Subsequently, remaining solvents can be removed from the stretched product by extraction or evaporation, again taking care not to disrupt polymer crystallinity by increasing the temperature too much, that is not above the temperature at which the gel changes back to a solution and not above $T_m$, preferably at least several degrees below $T_m$, until the fibre is substantially free of solvent. It should be realized, that $T_m$ of the polymer can increase upon increasing molecular orientation during stretching. Stretching and removal of solvent can also take place simultaneously.

After removal of solvent, the product can subsequently be further stretched in the solid state below $T_m$. The solid-state stretch ratio that can be applied is again dependent on the type of polymer and stretch ratios applied in the other stages (solution and gel stretching). In general it can vary from 1 up to about 100 or even more. Preferably, solid-state stretching is performed at elevated temperature, up to slightly below the crystalline melting point $T_m$ of the polymer in the product. Solid-state stretching may also take place in more than one step; for example at different, increasing temperatures. This may result in a higher maximum stretch ratio and in better mechanical properties of the fibre.

In the method according to the invention the stretch ratio that is applied to the product below the melting point of the polymer, is at least 5. This stretch ratio is the total or overall stretch ratio and is calculated as the multiplication of the stretch ratios applied to the product below the melting point of the polymer in the various possible stages of the method; which can include the solution stretch ratio, the gel stretch ratio and/or the solid-state stretch ratio.

Preferably, this total stretch ratio applied below $T_m$ is at least 10, more preferably at least 20, even more preferably at least 50, still more preferably at least 100, even more preferably at least 200. The advantage of applying a higher stretch ratio below $T_m$ is a better orientation of both polymer molecules and nanotubes, resulting in higher tensile strength.

The invention further relates to high strength elongated products, preferably fibres, containing nanotubes obtainable by the method according to the invention.

The invention especially relates to high strength aromatic polyamide and polyolefin elongated products, preferably fibres, containing nanotubes. More specifically, the invention concerns such fibres having a tensile strength of higher than 3.0 GPa, preferably higher than 3.5 GPa, more preferably higher than 4.0 GPa, still more preferably higher than 4.5 GPa, even more preferably higher than 5.0 GPa, still more preferably higher than 5.5 GPa, and most preferably higher than 6.0 GPa.

Preferably such high strength polyolefin fibres are made from a composition comprising ultra high molecular weight polyethylene with a mass average molecular weight of more than 500.000 g/mol and nanotubes. Such polyolefin fibres may be produced on an industrial scale as multi-filament yarns using the method according to the invention. Polyethylene fibres of such high strength have been mentioned before in literature, but only for a monofilament made on laboratory scale and not containing dispersed nanotubes.

The invention also relates to a process for making composite articles wherein high strength elongated products, like fibres, containing nanotubes obtainable by the method according to the invention are used. The advantage of this process is that a lower amount of fibres can be used for making an article of certain properties, or articles of higher mechanical strength can be made. Examples of such composite articles include ropes, nets, cables, and anti-ballistic composites like panels or protective clothing. Especially for making anti-ballistic composites of lower weight, that still show the required protective performance, fibres containing nanotubes and having improved strength are advantageous.

The invention claimed is:

1. Method of producing a high strength and high modulus elongated product comprising the steps of (a) making a composition comprising a semi-crystalline polymer and nanotubes, (b) extruding said composition into an elongated product, and (c) stretching the product below the melting point of the polymer, wherein in step (a) the composition is a colloidal dispersion of nanotubes in a solution of the polymer.

2. Method according to claim 1, wherein the nanotubes are carbon nanotubes.

3. Method according to claim 1, wherein the nanotubes are single-wall nanotubes.

4. Method of producing a high strength and high modulus elongated product comprising the steps of (a) making a composition comprising a semi-crystalline polymer and nanotubes, (b) extruding said composition into an elongated product, and (c) stretching the product below the melting point of the polymer, wherein
   in step (a) the composition is a colloidal dispersion of nanotubes in a solution of the polymer and is obtained by mixing
      (a1) a colloidal dispersion of nanotubes and optionally other components in a solvent 1; and
      (a2) a solution of the polymer in a solvent 2, wherein solvents 1 and 2 are miscible, and wherein
   in step (c) a stretch ratio of at least 5 is applied.

5. Method according to claim 1, wherein the semicrystalline polymer is at least one selected from the group consisting of polyamides, polyesters, polyketones, polyoxazoles, polyimidazoles, polyvinyls and polyolefins.

6. Method according to claim 5, wherein the semicrystalline polymer is a polyethylene of molar mass Mw above about 500,000 g/mol.

7. Method according to claim 4, wherein solvent 1 in (a1) is a halogenated hydrocarbon.

8. Method according to claim 4, wherein at least one other component in (a1) is used and comprises a dispersion aid.

9. Method according to claim 8, wherein the dispersion aid is a non-ionic surfactant.

10. Method according to claim 4, wherein at least one other component in (a1) is used and comprises the polymer.

11. Method according to claim 4, wherein (a1) is first prepared with a low concentration of components, but is concentrated after a colloidal dispersion of the nanotubes is obtained.

12. Method of producing a high strength and high modulus elongated product comprising the steps of (a) making a composition comprising a semi-crystalline polymer and nanotubes, (b) extruding said composition into an elongated product, and (c) stretching the product below the melting point of the polymer, wherein in step (a) the composition is a colloidal dispersion of nanotubes in a solution of the polymer and further comprising a step wherein the product is stretched as a gel product below the melting point of the polymer.

13. Method according to claim 1, wherein the elongated product contains about 1-10 mass % of nanotubes based on the polymer.

14. Method of producing a high strength and high modulus elongated product comprising the steps of (a) making a composition comprising a semi-crystalline polymer and nanotubes, (b) extruding said composition into an elongated product, and (c) stretching the product below the melting point of the polymer, wherein the stretch ratio applied below the melting point of the polymer is at least 10.

15. Fibre containing a semi-crystalline polymer and nanotubes, wherein the fibre has a tensile strength of higher than 3.0 GPa, and wherein the semi-crystalline polymer is selected from the group consisting of polyesters, polyketones, polyvinyls and polyolefins.

16. A composite article comprising nanotube-containing fibre according to claim 15.

17. Anti-ballistic composites comprising fibres according to claim 15.

18. Method according to claim 4, wherein the semicrystalline polymer is at least one selected from the group consisting of polyamides, polyesters, polyketones, polyoxazoles, polyimidazoles, polyvinyls and polyolefins.

19. Method according to claim 4, further comprising a step wherein the product is stretched as a gel product below the melting point of the polymer.

20. Method according to claim 4, wherein the elongated product contains about 1-10 mass % of nanotubes based on the polymer.

21. Method according to claim 4, wherein the stretch ratio applied below the melting point of the polymer is at least 10.

22. Ultrahigh molecular weight polyethylene (UHMWPE) fibres containing nanotubes, wherein the UHMWPE fibres have a tensile strength of higher than 3.0 GPa.

23. A composite article comprising the UHMWPE fibres according to claim 22.

24. Anti-ballistic composites comprising the UHMWPE fibers according to claim 22.

25. Method according to claim 1, wherein the polymer is a polyethylene of molar mass Mw above about 1,000,000 g/mol.

26. Fibre containing a semi-crystalline polymer and nanotubes, wherein the fibre has a tensile strength of higher than 3.0 GPa, and wherein the semi-crystalline polymer is a polyolefin.

27. A composite article comprising nanotube-containing fibre according to claim 26.

28. Anti-ballistic composites comprising fibres according to claim 26.

* * * * *